(12) United States Patent
McKinzie (10) Patent No.: US 11,639,594 B2
(45) Date of Patent: May 2, 2023

(54) TRANSMISSION SYSTEM WITH TRACTION MOTOR-DRIVEN HYDRAULIC CIRCUIT AND METHOD OF CONTROLLING SAME

(71) Applicant: Deere & Company, Moline, IL (US)

(72) Inventor: Kyle K. McKinzie, Oswego, KS (US)

(73) Assignee: DEERE & COMPANY, Moline, IL (US)

( * ) Notice: Subject to any disclaimer, the term of this patent is extended or adjusted under 35 U.S.C. 154(b) by 172 days.

(21) Appl. No.: 17/148,827

(22) Filed: Jan. 14, 2021

(65) Prior Publication Data

US 2022/0220703 A1    Jul. 14, 2022

(51) Int. Cl.
*E02F 9/22*     (2006.01)
*F16H 61/00*    (2006.01)
*F15B 1/033*    (2006.01)

(52) U.S. Cl.
CPC .......... *E02F 9/2253* (2013.01); *E02F 9/2217* (2013.01); *E02F 9/2228* (2013.01); *E02F 9/2267* (2013.01); *E02F 9/2278* (2013.01); *F15B 1/033* (2013.01); *F16H 61/0021* (2013.01); *F15B 2211/212* (2013.01); *F15B 2211/25* (2013.01); *F16H 2061/0034* (2013.01)

(58) Field of Classification Search
CPC .......... F16H 2061/0034; F16H 61/0021; E02F 9/2253; E02F 9/2217; E02F 9/2228; E02F 9/2267; E02F 9/2278
See application file for complete search history.

(56) References Cited

U.S. PATENT DOCUMENTS

| | | | |
|---|---|---|---|
| 5,135,091 A * | 8/1992 | Albers | F16D 48/066 192/85.48 |
| 8,069,661 B2 * | 12/2011 | Hendrickson | F16H 61/0021 60/417 |
| 8,356,529 B2 * | 1/2013 | Lundberg | F16H 61/688 |
| 8,639,424 B2 | 1/2014 | Lundberg et al. | |
| 8,826,655 B2 | 9/2014 | Neuner | |
| 8,826,760 B2 * | 9/2014 | Feldt | F16H 57/0446 74/335 |

(Continued)

FOREIGN PATENT DOCUMENTS

JP          2020085174 A  *  6/2020  ............ E02F 9/2253

*Primary Examiner* — Thomas E Lazo
(74) *Attorney, Agent, or Firm* — Klintworth & Rozenblat IP LLP (57) ABSTRACT

A transmission system includes a transmission assembly having clutches to transmit power from an input shaft to an output shaft at a plurality of gear ratios. A traction motor drives the input shaft and propels the work vehicle, while a controller controls operation of the transmission assembly and the traction motor. A hydraulic circuit controls actuation of the clutches responsive to commands from the controller. The hydraulic circuit includes a hydraulic pump driven by the traction motor, an accumulator connected to the hydraulic pump and that holds hydraulic fluid therein under pressure, and an unloading valve positioned in a secondary fluid path running from an outlet of the hydraulic pump to a sump. The unloading valve operates in a closed state to direct hydraulic fluid from the hydraulic pump to the accumulator and operates in an open state to direct hydraulic fluid from the hydraulic pump to the sump.

17 Claims, 4 Drawing Sheets

(56) References Cited

U.S. PATENT DOCUMENTS

| | | | |
|---|---|---|---|
| 8,840,524 B2* | 9/2014 | Arsenault | B60K 6/12 477/5 |
| 8,855,878 B2 | 10/2014 | Otanez et al. | |
| 9,903,422 B2* | 2/2018 | Schuller | F16H 61/0031 |
| 10,184,561 B2* | 1/2019 | Novak | F16H 61/0206 |
| 10,336,338 B2* | 7/2019 | Nakamura | B60W 30/194 |
| 10,443,699 B2* | 10/2019 | Hartman | F16H 61/143 |
| 2009/0112431 A1* | 4/2009 | Davidsson | F16D 48/066 701/69 |
| 2011/0209470 A1* | 9/2011 | Dougan | F16H 61/0021 60/494 |
| 2012/0088630 A1* | 4/2012 | Zhang | B60W 10/115 477/52 |
| 2012/0088631 A1* | 4/2012 | Zhang | F02N 11/084 477/52 |

* cited by examiner

FIG. 4

TRANSMISSION SYSTEM WITH TRACTION MOTOR-DRIVEN HYDRAULIC CIRCUIT AND METHOD OF CONTROLLING SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to a transmission for a work vehicle, and more specifically, to a hydraulic circuit for controlling actuation of clutches in the transmission.

BACKGROUND OF THE DISCLOSURE

In many types of work vehicles, conventional transmissions utilize a hydraulic system or circuit that, among other functions, is employed to control a plurality of torque transmitting devices therein, such as clutches and brakes. The hydraulic system may include a pump that provides a pressurized hydraulic fluid to a plurality of actuating devices, including valves and/or solenoids, that are operable to direct the pressurized hydraulic fluid through the hydraulic fluid circuit to the clutches and brakes in the transmission. The hydraulic pump may be driven directly via an input shaft rotated by the engine of the vehicle, and therefore, is always turning and producing a pressurized flow of hydraulic fluid anytime the engine is running. The hydraulic pump is thus able to deliver control pressure for the transmission during operation of the work vehicle so that the clutches and brakes can be engaged or disengaged to obtain different gear ratios.

SUMMARY OF THE DISCLOSURE

A transmission system for a work vehicle is disclosed. The transmission system includes a transmission assembly having an input shaft, an output shaft, and a plurality of clutches operable to transmit power from the input shaft to the output shaft at a plurality of gear ratios. The transmission system also includes a traction motor to drive the input shaft and operate a drive component to propel the work vehicle, a controller, including a processor and memory architecture, that controls operation of the transmission assembly and the traction motor, and a hydraulic circuit configured to control actuation of the plurality of clutches responsive to commands from the controller. The hydraulic circuit includes, in turn, a hydraulic pump driven by the traction motor to draw hydraulic fluid from a sump and circulate the hydraulic fluid through the hydraulic circuit, an accumulator connected to the hydraulic pump via a high-pressure fluid path and configured to hold hydraulic fluid therein under pressure to provide for actuation of the plurality of clutches, and an unloading valve positioned in a secondary fluid path running from an outlet of the hydraulic pump to the sump. The unloading valve is operable in a closed state to cause a flow of hydraulic fluid from the hydraulic pump to be directed to the high-pressure fluid path and is operable in an open state to cause a flow of hydraulic fluid from the hydraulic pump to be directed to the sump.

A controller-implemented method for operating a transmission system of a work vehicle is further disclosed. The method includes providing a transmission assembly having an input shaft, an output shaft, and a plurality of clutches operable to transmit power from the input shaft to the output shaft at a plurality of gear ratios and providing a traction motor configured to drive the input shaft of the transmission assembly and propel the work vehicle via a drive component thereof. The method also includes operating, via a controller, the traction motor to drive a hydraulic pump to draw hydraulic fluid from a sump and circulate the hydraulic fluid through a hydraulic circuit, selectively charging, via the controller, an accumulator fluidly coupled to the hydraulic pump with the hydraulic fluid to provide for actuation of the plurality of clutches, and operating, via the controller, an unloading valve positioned in a secondary fluid path running from an outlet of the hydraulic pump to the sump to direct a flow of the hydraulic fluid from the hydraulic pump within the hydraulic circuit. Operating the unloading valve, in turn, includes operating the unloading valve in a closed state to direct the flow of hydraulic fluid from the hydraulic pump to the accumulator and operating the unloading valve in an open state to direct the flow of hydraulic fluid from the hydraulic pump directly to the sump.

A power train of a work vehicle is still further disclosed. The power train includes a transmission having a plurality of clutches configured for selective engagement to operate the work vehicle in a plurality of gears and a traction motor to provide power to drive an input side of the transmission and propel the work vehicle, with a controller provided to control operation of the transmission. A hydraulic circuit operates the transmission and actuates the plurality of clutches therein, with the hydraulic circuit including a hydraulic pump driven by the traction motor to circulate hydraulic fluid in the hydraulic circuit from a sump along a high-pressure fluid path, an accumulator connected to the high-pressure fluid path and configured to hold hydraulic fluid therein under pressure to provide for actuation of the plurality of clutches when charged, and an unloading valve positioned in a secondary fluid path running from an outlet of the hydraulic pump to the sump. The unloading valve is operable in a closed state to cause a flow of hydraulic fluid from the hydraulic pump to be directed to the high-pressure fluid path and is operable in an open state to cause a flow of hydraulic fluid from the hydraulic pump to be directed to the sump.

The details of one or more implementations are set forth in the accompanying drawings and the description below. Other features and advantages will become apparent from the description, the drawings, and the claims.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

The following describes one or more example embodiments of the disclosed transmission system, as shown in the accompanying figures of the drawings described briefly above. Various modifications to the example embodiments may be contemplated by one of skill in the art without departing from the scope of the present invention, as set-forth the appended claims.

Overview

As previously noted, conventional transmissions typically utilize a hydraulic circuit having a pump that is driven off the input side of the transmission, with the hydraulic pump directly coupled to the engine of the vehicle to produce pressurized flow of hydraulic fluid while the engine is running. The hydraulic pump, therefore, is able to deliver control pressure for the transmission such that it can actuate torque transmitting devices therein, including clutches and brakes.

Electrically or hydrostatically driven transmissions differ from conventional transmissions in that the input side of the transmission is not always normally powered. Instead, in electrically or hydrostatically driven transmission arrangements, the input side is only turning as the vehicle is in motion, due to selective operation of the electric or hydrostatic motor that drives the input side being coordinated with operation for vehicle movement. This means a typical hydraulic circuit cannot be used, since the hydraulic pump producing the control pressure in the circuit is not able to produce flow during periods that the work vehicle is at rest. To work around this problem, it is common to drive the transmission control circuit pump separate from the transmission, often with a dedicated electric motor. This type of circuit has the advantage of being able to be "on-to demand" and only driven, and thus consume power, when needed. However, the inclusion and use of a dedicated electric motor for driving the hydraulic pump on-demand can increase the cost and complexity of the circuit due to the need to produce and/or convert additional electrical power to drive the pump and provide associated mechanical mounting and connections.

To address the limitations and drawbacks of existing hydraulic circuits for electrically and hydrostatically driven transmissions, a transmission system with a traction motor-driven hydraulic circuit, as well as an associated control method for the transmission system, are provided herein. The pump of the hydraulic circuit is driven by a traction motor of the vehicle power train that also propels the vehicle, thereby negating the need for a separate dedicated electric motor for driving the pump. When powered by the traction motor, the pump circulates hydraulic fluid through the hydraulic circuit. An accumulator in the hydraulic circuit can be charged by the pump to hold hydraulic fluid therein under pressure, such that when the work vehicle is not moving (or moving slowly) and the pump is not powered by the traction motor, the accumulator is able to provide hydraulic fluid under pressure to actuate torque transmitting devices in the transmission.

According to embodiments, the state of charge of the accumulator is monitored by a controller in order to maintain control pressure in the hydraulic circuit and ensure that the hydraulic circuit is able to provide adequate pressure for performing a clutch shift event. Based on the state of charge of the accumulator, the controller selectively operates the pump and an associated unloading valve in the hydraulic circuit in order to re-charge the accumulator as needed. When the controller determines that the state of charge of the accumulator is not at an adequate level, the controller causes the traction motor to drive the pump and operates the unloading valve in a closed state to cause a flow of hydraulic fluid from the pump to be directed to the accumulator. When the controller determines that the state of charge of the accumulator is at an adequate level, the controller operates the unloading valve in an open state, such that any flow of hydraulic fluid from the pump is returned directly to the sump in the hydraulic circuit at low pressure, thereby minimizing parasitic losses within the hydraulic circuit.

In certain implementations, when the accumulator is not at an adequate state of charge, the controller identifies an operational mode of the work vehicle and controls the traction motor and transmission accordingly in order to provide for charging of the accumulator. That is, when the work vehicle is in a startup sequence, the controller causes the traction motor to operate and spin the input side of the transmission, while the transmission is in neutral, to drive the hydraulic pump and thereby cause hydraulic fluid to be pumped through the hydraulic circuit and to the accumulator to provide for charging thereof, with running of the traction motor and operation of the transmission in neutral being maintained until the accumulator has been adequately charged. Conversely, when the work vehicle is in a normal operating mode, the controller limits operation of the transmission to its current operating mode or gear, with the traction motor driving the hydraulic pump to cause hydraulic fluid to be pumped to the accumulator to re-charge the accumulator, with the transmission limited to its current operating mode until the accumulator has been adequately charged.

Accordingly, a transmission system and method of controlling thereof is provided that allows the pump in the hydraulic circuit to be driven off the input side of the transmission via the traction motor and only produce high pressure, and thus consume high power, when needed.

Example embodiments of a work vehicle with a transmission system having a traction motor-driven hydraulic circuit, as well as an associated control method for the transmission system, will now be described in conjunction with FIGS. 1-4. By way of non-limiting examples, the following describes the transmission system as incorporated into a backhoe loader with an electrically controlled transmission. The following examples notwithstanding, the transmission system can be incorporated into other types of work vehicles or machines that include a hydraulic circuit for operating an electrical or hydrostatic transmission therein. It is therefore recognized that aspects of the invention are not meant to be limited only to the specific embodiments described hereafter. As will become apparent from the discussion herein, a transmission system and associated control scheme may be used advantageously in a variety of settings and with a variety of machinery.

Figure 1:
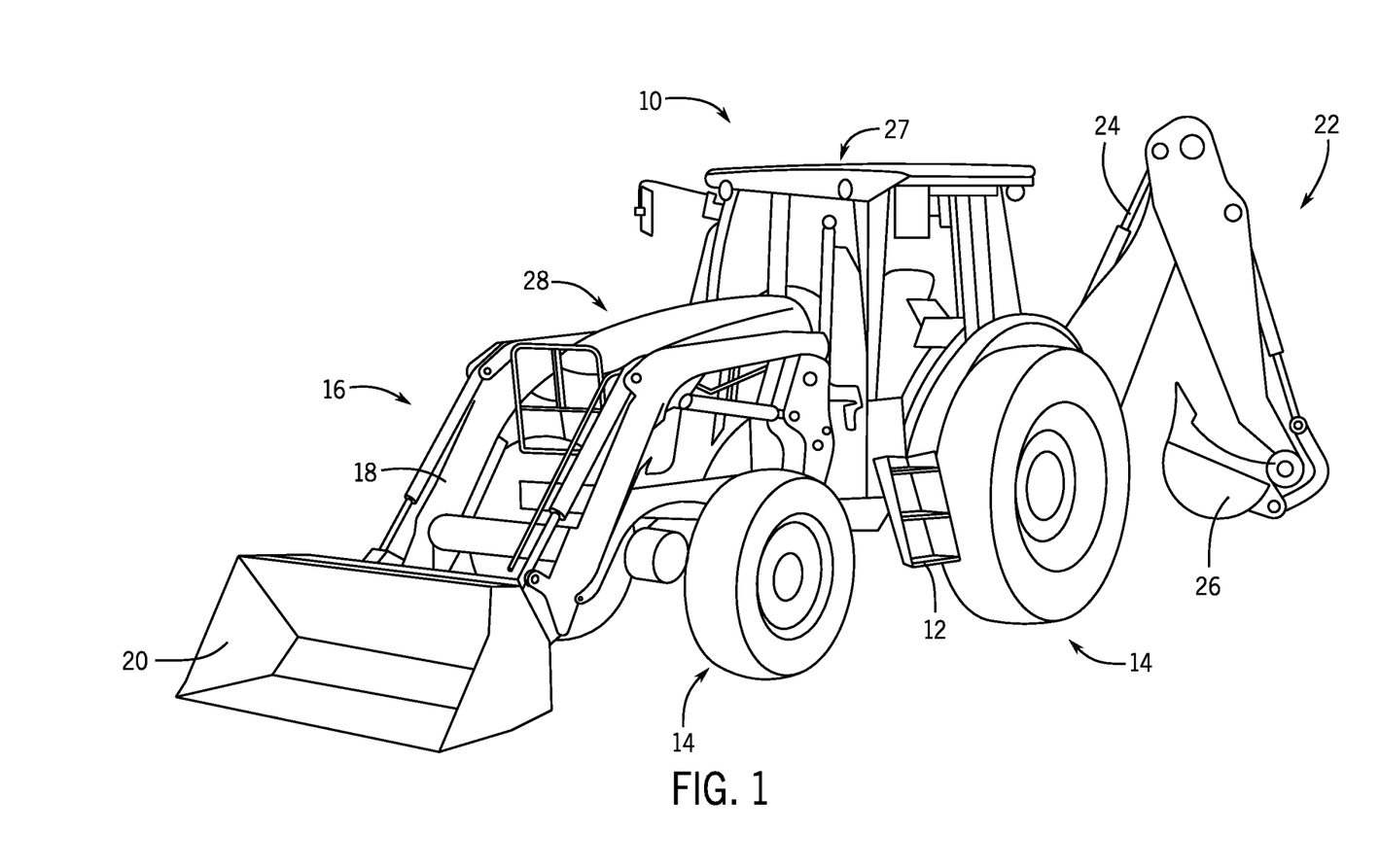
FIG. 1 is a side perspective view of an example work vehicle that may include a transmission system in accordance with an embodiment.

Example Embodiments of a Work Vehicle with a Transmission System Having a Traction Motor-Driven Hydraulic Circuit With initial reference to FIG. 1, an example work vehicle 10 of the present disclosure is depicted as a backhoe loader.

Although the work vehicle 10 is illustrated and described hereinafter as a "backhoe loader 10," the work vehicle may include a motor grader, a tractor, a bulldozer, a feller buncher, a crawler, an excavator, a skidder, a forwarder, or another utility vehicle. The backhoe loader 10 includes a chassis 12 and a ground engaging mechanism or ground drive element 14. The ground engaging mechanism 14 is capable of supporting the chassis 12 and propelling the chassis 12 across the ground. Although the illustrated backhoe loader 10 includes wheels as ground engaging mechanism 14, backhoe loader 10 may include other ground engaging mechanisms, such as steel tracks, rubber tracks, or other suitable ground engaging members.

The backhoe loader 10 further includes a loader assembly 16 and a backhoe assembly 22. As illustrated in FIG. 1, the loader assembly 16 includes a loader boom 18 and a work tool 20 in the form of a bucket. The work tool 20 may be capable of moving, excavating, plowing, or performing other material handling functions on a load, such as dirt or other materials. Other suitable work tools include, for example, blades, pallet forks, bale lifts, augers, harvesters, tillers, mowers, and grapples. The loader boom 18 is configured to move relative to the chassis 12 to move and operate the work tool 20. The backhoe assembly 22 of the backhoe loader 10 includes a backhoe boom 24 and a tool such as a backhoe bucket 26 having telehandler tool features. The backhoe boom 24 is attached to the chassis 12 by a swing frame, with the backhoe boom 24 being pivotable relative to the chassis 12. The backhoe bucket 26 is in turn pivotably mounted to the backhoe boom 24 and extendable away therefrom via an extendable dipperstick, such that the backhoe bucket 26 has further freedom of movement during operation.

An operator controls the functions of the backhoe loader 10, including the ground engaging mechanism 14, the loader assembly 16, and the backhoe assembly 22, from an operator station 27 in the backhoe loader 10. While not shown in FIG. 1, it is recognized that the operator station 27 may include a human-machine interface and various controls therein configured to receive input commands from the operator to control, for example, various electric or hydraulic systems associated with actuating and controlling the loader assembly 16 and the backhoe assembly 22. The human-machine interface may be configured in a variety of ways and may include one or more joysticks, various switches or levers, one or more buttons, a touchscreen interface that may be overlaid on a display, a keyboard, a speaker, a microphone associated with a speech recognition system, or various other human-machine interface devices.

Figure 2:
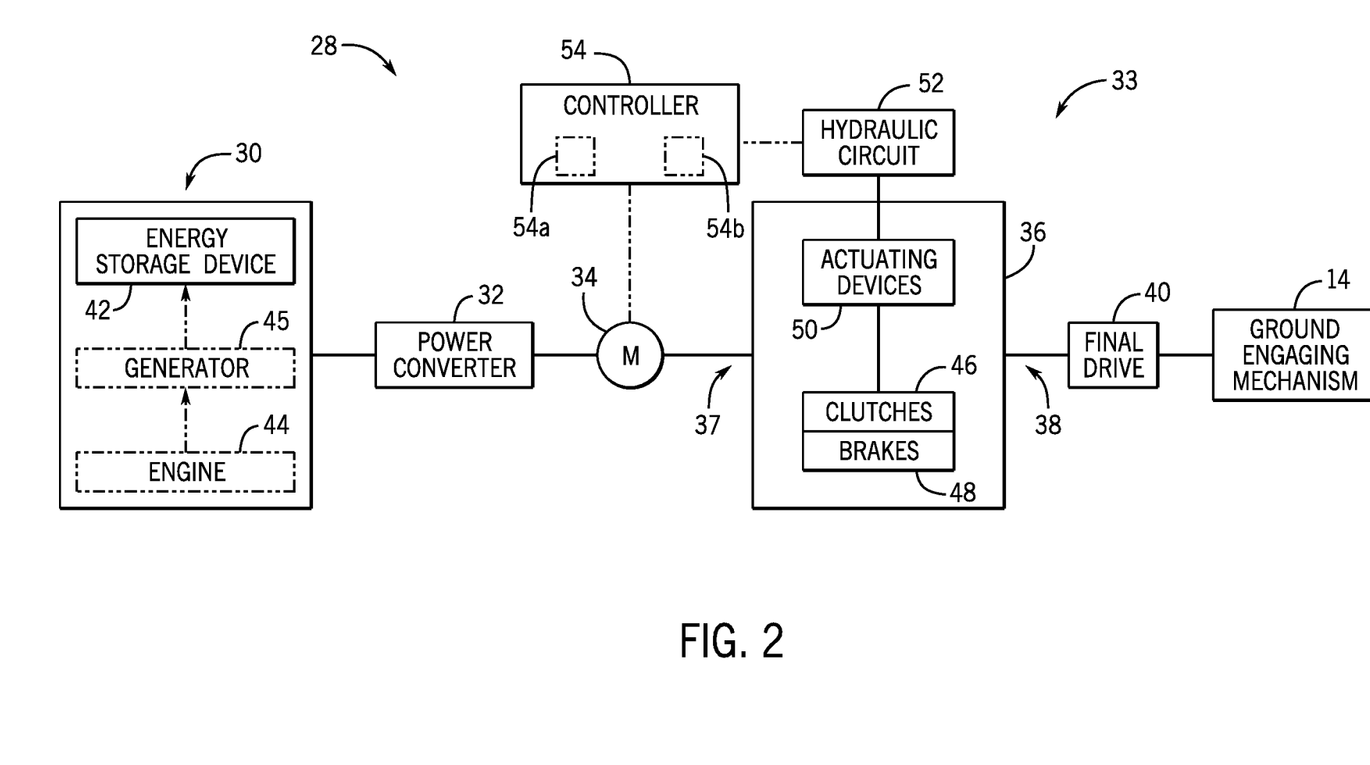
FIG. 2 is a schematic view of a power train of the work vehicle of FIG. 1, including the transmission system and an associated hydraulic circuit.

The chassis 12 also supports a power train 28 that provides, generates, and distributes mechanical and electrical power to various components of the backhoe loader 10. Referring now to FIG. 2, various components of an example power train 28 that may be included on the backhoe loader 10 are depicted. The power train 28 can be generally characterized as including a primary power source 30 and associated power converter 32, as well as a transmission system 33 that includes a traction motor 34 and a transmission assembly 36, along with associated control components that will be described further below. In operation of the transmission system 33, output power from the traction motor 34 may be provided to an input shaft 37 of the transmission assembly 36, with the transmission assembly 36 selectively transmitting power from the input shaft 37 to an output shaft 38 thereof at a plurality of gear ratios. The output shaft 38 provides power to a final drive 40 (drive axle, gear reduction, etc.) and the ground engaging mechanism 14 in order to propel the backhoe loader 10.

In example embodiments, the power train 28 may be configured as a hybrid-electric power train or a battery-electric power train. In either configuration, the power source 30 of the power train 28 includes an energy storage device 42. The energy storage device 42 is configured as a high-voltage or high-power energy storage device and may be a battery, a flywheel system, fuel cell, an ultracapacitor, or a combination of ultracapacitors, fuel cells, and/or batteries, as examples. The energy storage device 42 is configured to provide power for operating the traction motor 34 and to also receive energy during operation of the backhoe loader 10 in order to recharge the energy storage device 42.

As shown in phantom in FIG. 2, the power source 30 may also include an engine 44 configured to generate power for the backhoe loader 10 and provide power to components and accessories thereon. The engine 44 may be configured, for example, as a diesel engine or other internal combustion engine. Where the power source 30 includes the engine 44, a generator 45 (also shown in phantom) is additionally provided to convert mechanical energy from the engine 44 into electric energy. The generator 45 may therefore include an alternator and rectifier combination (not shown) that generates an alternating voltage from the engine 44 and then rectifies the alternating voltage to produce a low DC voltage power that is provided to the power source 30 to be stored thereby.

The power converter 32 receives power from the energy storage device 42, such as via a DC bus. The power converter 32 may be configured as a traction boost converter, sometimes referred to as a bi-directional DC-DC converter or bi-directional boost/buck converter. In a motoring mode of operation, the power converter 32 receives a low DC voltage power input from the energy storage device 42 and "boosts" the low DC voltage to produce a high DC voltage power output. The high DC voltage power output may then be conditioned (e.g., inverted) by the power converter 32 before being provided to the traction motor 34. In a regenerative mode of operation, the power converter 32 receives a high DC voltage power produced from the traction motor 34 during operation and "bucks" the high DC voltage down to a low DC voltage power output that is provided back to the energy storage device 42.

The traction motor 34 may be configured to convert electrical energy into mechanical energy ("motoring mode"), or to convert mechanical energy into electric energy ("regenerative mode"). In the motoring mode, the traction motor 34 is operable to receive electric energy from the power converter 32 and convert it into mechanical energy for driving the input to the transmission assembly 36 and providing power to the final drive 40 and the ground engaging mechanism 14. In the regenerative mode, the traction motor 34 is operable to convert mechanical energy into electric energy so as to supply electric energy back to the power converter 32, thereby braking (i.e., slowing down) the rotational speed of the traction motor 34 and thus the speed of the backhoe loader 10. According to embodiments, the traction motor 34 may take the form of permanent magnet AC motor, a direct current motor or another suitable motor, such as a switched reluctance motor or an induction motor, which is operable at a variable speed.

While the power converter 32 and the traction motor 34 are described above as being a DC-DC converter and electric motor, the power converter 32 and traction motor 34 may instead be in the form of hydrostatic machines that receive mechanical input power (e.g., from the engine 44, with energy storage device 42 and generator being removed from power source 30) and convert that power to hydraulic power for driving the input shaft 37. Accordingly, the power converter 32 and traction motor 34 may be provided as a hydraulic pump and hydraulic motor that provide power to the output shaft 38, according to an embodiment.

Referring still to FIG. 2, the transmission assembly 36 may be configured as an electrically or hydrostatically driven transmission that includes various selectable transmission components, including clutches 46 and brakes 48 (as shown in FIG. 2) of suitable configurations (wet clutches, dry clutches, dog collar clutches, etc.) as well as synchronizers (not shown) or other similar devices. The clutches 46 and brakes 48 may have engaged positions and disengaged positions that selectively transmit or prevent power transfer between a power input side and power output side of the transmission assembly 36. Also, in certain implementations, the transmission assembly 36 may be configured as an infinitely variable transmission ("IVT") or continuously variable transmission ("CVT") that selectively allows for power from multiple types of power sources to be provided to the output shaft 38 and onto the final drive 40 and ground engaging mechanism 14. In such an embodiment, an arrangement of clutches 46 and brakes 48 in the transmission assembly 36, as well as additional gearsets and shafts therein (not shown), would enable the IVT/CVT to provide power to the output shaft 38 in a variety of combinations, such that the transmission assembly 36 would be operable in a direct drive mode, a split path mode, and a series mode of operation, for example.

A plurality of actuators 50 is included in transmission assembly 36 for switching the clutches 46 and brakes 48 between engaged and disengaged positions. The actuators 50 may be configured as electro-hydraulically controlled proportional valves, for example, and are operated via a hydraulic circuit 52 in order to actuate the clutches 46 and brakes 48. The hydraulic circuit 52 may be configured as a closed-loop, hydrostatic system that is operable by a pressurized flow of hydraulic fluid, i.e., hydraulic oil, to provide control of the actuators 50 for engaging and disengaging the clutches 46 and brakes 48 according to a desired operation The power train 28 further includes a controller 54 that may be in electrical (or other) communication with various devices of the backhoe loader 10, to control various aspects of the operation thereof. In particular, the controller 54 may communicate with the hydraulic circuit 52 and traction motor 34 to control operation of the transmission assembly 36 and the power train 28 in general. The controller 54 may be configured as a computing device with one or more associated processors 54a and memory architectures 54b, and configured as a hydraulic, electrical, or electro-hydraulic controller, or otherwise. As such, the controller 54 may be configured to execute various computational and control functionalities with respect to the hydraulic circuit 52 and traction motor 34 and may be in electronic or hydraulic communication with those systems/devices. In various embodiments, the controller 54 may communicate with actuators, sensors, valves and other devices associated with the hydraulic circuit 52 and traction motor 34.

Figure 3:
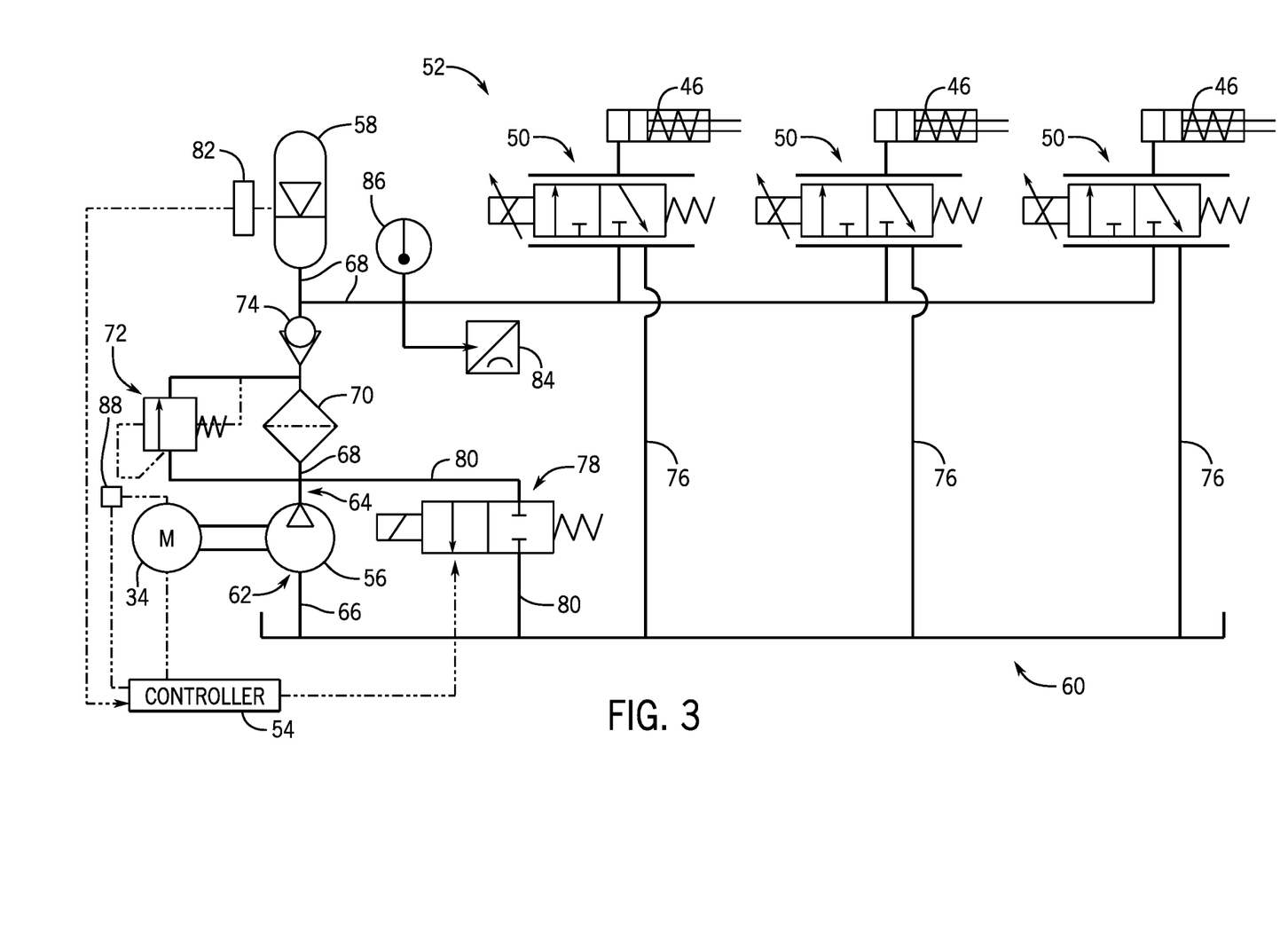
FIG. 3 is a simplified schematic view of the hydraulic circuit.

Referring now to FIG. 3, the hydraulic circuit 52 of powertrain is illustrated in further detail. The hydraulic circuit 52 generally includes a pump 56, accumulator 58, sump 60, and actuators 50 for operating the clutches 46. The hydraulic circuit 52 is operable to selectively engage the clutches 46 by selectively communicating a hydraulic fluid from the sump 60 to the actuators 50, which in the illustrated embodiment are electro-hydraulically controlled proportional valves operable to engage the plurality of clutches 46. The hydraulic fluid is communicated from the sump 60 to the actuators 50 under pressure via operation of the pump 56 and accumulator 58.

The sump 60 is a tank or reservoir to which the hydraulic fluid returns and collects from various components and regions of the transmission assembly 36. The hydraulic fluid is forced from the sump 60 via the pump 56, which is driven by the traction motor 34 of power train 28, as shown in FIG. 3. The pump 56 may be a fixed, positive displacement pump that generates a pressurized flow of hydraulic fluid, such as a gear pump, a vane pump, or a gerotor pump, for example. The pump 56 includes an inlet port 62 and an outlet port 64. The inlet port 62 communicates with the sump 60 via a suction path 66. The outlet port 64 communicates pressurized hydraulic fluid to a high-pressure fluid path 68. The high-pressure fluid path 68 may include various optional features including, for example, a pressure side filter 70 and a filter bypass 72.

The high-pressure fluid path 68 communicates with the accumulator 58, with a check valve 74 positioned on the high-pressure fluid path 68 that can be opened by way of the hydraulic pressure of the pump 56 and locked in the reverse direction. The accumulator 58 is an energy storage device in which the non-compressible hydraulic fluid is held under pressure by an external source. While not shown in FIG. 3, it is recognized that the accumulator 58 could include a piston that has a seal that slides along a bore of the accumulator housing. On one side of the piston there is hydraulic fluid and on the other side of the piston there is one or more springs or a pressurized gas (e.g., nitrogen). The accumulator 58 uses the springs or pressurized gas to generate the force on one side of the piston that reacts against the hydraulic fluid pressure on the opposite side of the piston. The accumulator 58, when charged with hydraulic fluid and at a pressure higher than the high-pressure fluid path 68, provides pressurized hydraulic fluid to the actuators 50, to enable actuation of the clutches 46. Return lines 76 (drain lines) then lead from the actuators 50 back to the sump 60, to return hydraulic fluid back to the sump 60 at a low pressure.

Also included in hydraulic circuit 52 is an unloading valve 78 that is positioned between the outlet port 64 of pump 56 and the sump 60 along a secondary fluid path 80. The unloading valve 78 may be an electro-hydraulically controlled valve (i.e., "EH unloading valve") that is selectively opened and closed to allow and prevent hydraulic fluid to be pumped into the sump 60. When the unloading valve 78 is in an open position, a flow of hydraulic fluid output from the pump 56 is dumped directly into the sump 60 through the secondary fluid path 80. When the unloading valve 78 is in a closed position, a flow of hydraulic fluid output from the pump 56 is directed into the high-pressure fluid path 68 and subsequently into the accumulator 58.

The controller 54 is in operable communication with the hydraulic circuit 52 and operates to control the flow of hydraulic fluid through the system. The controller 54 receives operating data on the power train 28 to selectively control operation of the components therein, including operation of the clutches 46, the unloading valve 78, and the accumulator 58, as well as the traction motor 34. The controller 54 receives inputs in the form of operator commands and operational data from one or more sensors in the hydraulic circuit 52, with FIG. 3 showing an accumulator charge sensor 82 (e.g., linear position sensor) that senses a state of charge of the accumulator 58 and pressure and temperature sensors 84, 86 that read the pressure and temperature of the hydraulic fluid in the system, with the sensors providing this data to the controller 54 in real-time. Additional sensor(s) 88 may monitor the operation of the traction motor 34 and provide that data to the controller 54.

Via the controller 54, the pump 56 in the hydraulic circuit 52 may be selectively driven by the traction motor 34 to only produce high pressure when needed, and otherwise use the accumulator 58 to provide a flow pressure of hydraulic fluid when the backhoe loader 10 is not moving or moving slowly and the pump 56 is unable to produce needed flow. The controller 54 monitors the state of charge of the accumulator 58 and controls the unloading valve 78 to either return pump flow directly to the sump 60 or cause pump flow to be directed to recharge the accumulator 58, in order to maintain control pressure and ample margin in the hydraulic circuit 52.

Figure 4:
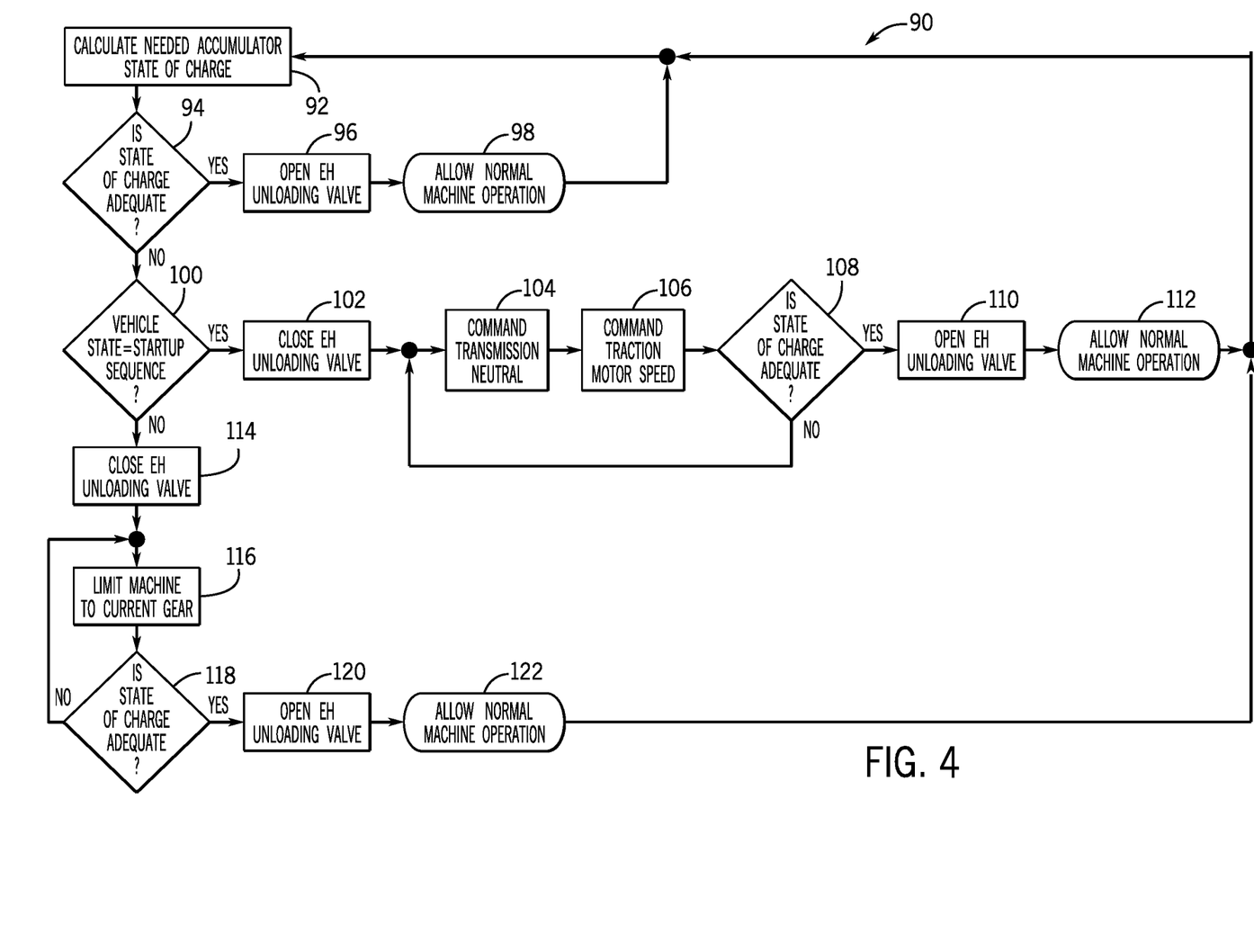
FIG. 4 is a flowchart illustrating a method for controlling the hydraulic circuit of FIG. 3.

Referring now also to FIG. 4, and with continued reference to FIGS. 2 and 3, a flowchart illustrates a method or control scheme 90 implemented by the controller 54 in accordance with the present disclosure. Generally, the method 90 is implemented at startup and during typical operation of the backhoe loader 10, e.g., during forward and reverse propulsion, in order to enable shifting of the vehicle between different gears.

The method begins at step 92 by determining an accumulator state of charge that is needed to perform a desired operation in the hydraulic circuit 52. As an example, the controller 54 may calculate an accumulator state of charge that is needed to cause actuation of one or more clutches 46 of the transmission assembly 36, in order to allow the backhoe loader 10 to shift gears. According to embodiments, the state of charge needed to perform a desired operation in the hydraulic circuit 52 may be a variable amount or value based on a requested operation to be performed, i.e., a state of charge needed to perform a specific operation such as a gear change, or instead may be a fixed amount or value that is unchanged regardless of a specific operation that is requested. The state of charge needed to perform a desired operation in the hydraulic circuit 52 may therefore be set as a charge threshold that may be a fixed threshold or a threshold that varies based on the requested operation to be performed, according to embodiments.

Upon calculation of the needed accumulator state of charge, a determination is made at step 94 as to whether the current accumulator state of charge is adequate to meet this need, i.e., whether the state of charge meets a calculated charge threshold. This determination can be made by the controller 54 based on, at least, accumulator charge readings acquired by the sensor 82. If it is determined at step 94 that the accumulator state of charge is adequate to meet the determined need, then the method 90 continues to step 96 and causes the unloading valve 78 to actuate to an open state. With the unloading valve 78 in the open state, the pump 56 operates in a low power, low pressure state, and an output flow from the pump 56 is returned directly to the sump 60, thereby minimizing parasitic losses within the hydraulic circuit 52. Accordingly, with the accumulator state of charge being adequate to meet the need of a desired operation, and with the unloading valve 78 in the open state, normal operation of the backhoe loader 10 is allowed to proceed unimpeded at step 98, with no restrictions on shifting between different gears/modes of operation via use of the transmission assembly 36.

If it is determined at step 94 that the accumulator state of charge is not adequate to meet the determined need, then the method 90 proceeds to step 100, where a subsequent determination is made on the present state of the backhoe loader 10. That is, a determination is made at step 100 as to whether the backhoe loader 10 is currently in a start-up sequence, where the traction motor 34 would not be generating enough power to drive the pump 56 to produce a necessary high-pressure flow for charging the accumulator 58 and/or operating the transmission assembly 36. If it is determined at step 100 that the backhoe loader 10 is currently in a start-up sequence, the method 90 continues to step 102, where the unloading valve 78 is caused to actuate to a closed state. With the unloading valve 78 in the closed state, the method 90 proceeds to steps 104 and 106, where the transmission assembly 36 is operated (and stays) in a neutral mode and the traction motor 34 is caused to operate at a desired speed (i.e., the input side of the transmission assembly 36 is spun). The operation of the traction motor 34 at a desired speed with the transmission assembly 36 in a neutral mode allows for the traction motor 34 to drive the pump 56 to generate a high-pressure flow of hydraulic fluid that is directed to the high-pressure fluid path 68 and to the accumulator 58, without there being any actuation of the clutches 46 in the transmission assembly 36 and/or power provided from the traction motor 34 to the output shaft 38 of the transmission assembly 36. In this manner, hydraulic fluid is provided to the accumulator 58 and the state of charge of the accumulator 58 is increased.

Another determination is then made at step 108 as to whether the accumulator state of charge is now adequate to meet the determined need, based on operation of the traction motor 34 at a desired speed. If the accumulator state of charge is not yet adequate, the method 90 reverts back to steps 104 and 106, with the transmission assembly 36 being maintained in neutral and the traction motor 34 continuing to operate the pump 56 to generate a flow of hydraulic fluid. Upon it being determined at step 108 that the accumulator state of charge is adequate to meet the determined need, the method 90 then proceeds to cause the unloading valve 78 to actuate to its open state at step 110. With the unloading valve 78 in the open state, the pump 56 operates in a low power, low pressure mode and an output flow from the pump 56 is returned directly to the sump 60, thereby minimizing parasitic losses within the hydraulic circuit 52. Accordingly, with the accumulator state of charge being adequate to meet the need of a desired operation, and with the unloading valve 78 in the open state, normal operation of the backhoe loader 10 is allowed to proceed unimpeded at step 112, with no restrictions on shifting between different gears/modes of operation via use of the transmission assembly 36.

Referring back to step 100 and the determination of the present state of the backhoe loader 10, if it is determined at step 100 that the backhoe loader 10 is not currently in a start-up sequence, but instead is in a normal operational mode (e.g., a normal forward propulsion mode), the method 90 continues to step 114 and actuates the unloading valve 78 to its closed state. With the unloading valve 78 actuated to its closed state, a high-pressure output flow is generated by the pump 56 and directed to the high-pressure fluid path 68 and to the accumulator 58. With the backhoe loader 10 in a normal operational mode but with the accumulator 58 not being in an adequate state of charge, the running pump 56 operates to charge the accumulator 58. At the same time, the method 90 proceeds to step 116, where the transmission assembly 36 is maintained in its current gear, without any actuation of the clutches 46 being allowed during this time. In this manner, hydraulic fluid is provided to the accumulator 58 and the state of charge of the accumulator 58 is increased.

With the backhoe loader 10 being maintained in its current gear, the method 90 continues to step 118 where another determination is made as to whether accumulator state of charge is adequate to meet the need of a desired operation (e.g., shifting) of the transmission assembly 36.

If the accumulator state of charge is not yet adequate, the method 90 reverts back to step 116, with the transmission assembly 36 being maintained in its current gear and the traction motor 34 continuing to operate the pump 56 to generate a high-pressure flow of hydraulic fluid. Upon it being determined at step 118 that the accumulator state of charge is adequate to meet the determined need, the method 90 then proceeds to cause the unloading valve 78 to actuate to its open state at step 120. With the unloading valve 78 in the open state, the pump 56 operates in a low power, low pressure mode and an output flow from the pump 56 is returned directly to the sump 60, thereby minimizing parasitic losses within the hydraulic circuit 52. Accordingly, with the accumulator state of charge being adequate to meet the need of a desired operation, and with the unloading valve 78 in the open state, normal operation of the backhoe loader 10 is allowed to proceed unimpeded at step 122, with no restrictions on shifting between different gears/modes of operation via use of the transmission assembly 36.

Upon completion of any of steps 98, 112, or 122, the method 90 returns to step 92 and continues to monitor the accumulator state of charge and its adequacy for accommodating a desired operation of the transmission assembly 36, with additional iterations of the method 90 being performed in order to allow the accumulator 58 to operate at the needed state of charge.

Accordingly, the present hydraulic circuit 52 provides an effective method for actuating clutches 46 in the transmission assembly 36 using power derived only from the traction motor 34 that propels the backhoe loader 10. A method or control scheme 90 is implemented by which the pump 56 (driven by the traction motor 34) selectively operates in a high-pressure mode to charge the hydraulic circuit 52 and the accumulator 58 and operates in a low-pressure mode in which hydraulic fluid is dumped directly into the sump 60 while the accumulator 58 provides a flow of pressurized hydraulic fluid necessary to operate the clutches 46. These aspects of the hydraulic circuit 52 eliminate the need for a separate, dedicated electric motor for driving the pump 56 of the hydraulic circuit 52 in an electrically or hydrostatically driven transmission.

Enumerated Examples

The following examples are provided, which are numbered for ease of reference.

1. A transmission system for a work vehicle includes a transmission assembly having an input shaft, an output shaft, and a plurality of clutches operable to transmit power from the input shaft to the output shaft at a plurality of gear ratios. The transmission system also includes a traction motor to drive the input shaft and operate a drive component to propel the work vehicle, a controller, including a processor and memory architecture, that controls operation of the transmission assembly and the traction motor, and a hydraulic circuit configured to control actuation of the plurality of clutches responsive to commands from the controller. The hydraulic circuit includes, in turn, a hydraulic pump driven by the traction motor to draw hydraulic fluid from a sump and circulate the hydraulic fluid through the hydraulic circuit, an accumulator connected to the hydraulic pump via a high-pressure fluid path and configured to hold hydraulic fluid therein under pressure to provide for actuation of the plurality of clutches, and an unloading valve positioned in a secondary fluid path running from an outlet of the hydraulic pump to the sump. The unloading valve is operable in a closed state to cause a flow of hydraulic fluid from the hydraulic pump to be directed to the high-pressure fluid path and is operable in an open state to cause a flow of hydraulic fluid from the hydraulic pump to be directed to the sump.

2. The transmission system of example 1, wherein the controller is programmed to determine a state of charge of the accumulator and selectively operate the unloading valve based on the state of charge of the accumulator.

3. The transmission system of example 2, wherein in determining the state of charge of the accumulator the controller is programmed to identify a needed state of charge of the accumulator necessary to perform a requested operation for the transmission assembly and determine if a current state of charge of the accumulator meets the needed state of charge.

4. The transmission system of example 3, wherein when the current state of charge meets the needed state of charge the controller is programmed to operate the unloading valve in the open state to cause hydraulic fluid to be pumped directly from the hydraulic pump to the sump.

5. The transmission system of example 4, wherein when the current state of charge meets the needed state of charge the controller is programmed to allow actuation of the plurality of clutches to drive the output shaft in any of the plurality of gear ratios.

6. The transmission system of example 3, wherein when the current state of charge does not meet the needed state of charge the controller is programmed to operate the unloading valve in the closed state to cause hydraulic fluid to be pumped from the hydraulic pump to the high-pressure fluid path and charge the accumulator.

7. The transmission system of example 6, wherein when operating the unloading valve in the closed state the controller is programmed to determine a current operational state of the work vehicle, the current operational state comprising one of a startup sequence and a normal operating mode 8. The transmission system of example 7, wherein when the work vehicle is in the startup sequence the controller is programmed to operate the transmission assembly in neutral, operate the traction motor to drive the hydraulic pump and thereby cause hydraulic fluid to be pumped from the hydraulic pump to the high-pressure fluid path and charge the accumulator, and maintain operation of the transmission assembly in neutral and operation of the traction motor to drive the hydraulic pump until the accumulator has been charged such that the current state of charge meets the needed state of charge.

9. The transmission system of example 7, wherein when the work vehicle is in the normal operating mode the controller is programmed to prevent actuation of the plurality of clutches to limit operation of the transmission assembly to its current operating mode, with the traction motor driving the hydraulic pump to thereby cause hydraulic fluid to be pumped from the hydraulic pump to the high-pressure fluid path and charge the accumulator, and maintain operation of the transmission assembly in its current operating mode until the accumulator has been charged such that the current state of charge meets the needed state of charge.

10. The transmission system of example 3, wherein the needed state of charge for performing the requested operation for the transmission assembly comprises a clutch pressure sufficient for actuation of one or more of the plurality of clutches during a shift event.

11. A controller-implemented method for operating a transmission system of a work vehicle includes providing a transmission assembly having an input shaft, an output shaft, and a plurality of clutches operable to transmit power from the input shaft to the output shaft at a plurality of gear ratios and providing a traction motor configured to drive the input shaft of the transmission assembly and propel the work vehicle via a drive component thereof. The method also includes operating, via a controller, the traction motor to drive a hydraulic pump to draw hydraulic fluid from a sump and circulate the hydraulic fluid through a hydraulic circuit, selectively charging, via the controller, an accumulator fluidly coupled to the hydraulic pump with the hydraulic fluid to provide for actuation of the plurality of clutches, and operating, via the controller, an unloading valve positioned in a secondary fluid path running from an outlet of the hydraulic pump to the sump to direct a flow of the hydraulic fluid from the hydraulic pump within the hydraulic circuit. Operating the unloading valve, in turn, includes operating the unloading valve in a closed state to direct the flow of hydraulic fluid from the hydraulic pump to the accumulator and operating the unloading valve in an open state to direct the flow of hydraulic fluid from the hydraulic pump directly to the sump.

12. The method of example 11, further including identifying, via the controller, a state of charge of the accumulator and selectively operating the unloading valve, via the controller, based on whether the state of charge of the accumulator meets the threshold charge level, with the unloading valve operated in the closed state when the state of charge does not meet the threshold charge level and operated in the open state when the state of charge meets the threshold charge level.

13. The method of example 12, wherein when operating the unloading valve in the closed state, the method further comprises determining, via the controller, a current operational state of the work vehicle, the current operational state comprising one of a startup sequence and a normal operating mode.

14. The method of example 13, wherein when the work vehicle is in the startup sequence, the method further includes operating the transmission assembly in neutral, operating the traction motor to drive the hydraulic pump, to thereby cause hydraulic fluid to be pumped from the hydraulic pump to charge the accumulator, and maintaining operation of the transmission assembly in neutral and operation of the traction motor to drive the hydraulic pump until the accumulator has been charged such that the state of charge meets the threshold charge level.

15. The method of example 13, wherein when the work vehicle is in the normal operating mode, the method further includes preventing actuation of the plurality of clutches to limit operation of the transmission assembly to its current operating mode, with the traction motor driving the hydraulic pump to thereby cause hydraulic fluid to be pumped from the hydraulic pump to charge the accumulator, and maintaining operation of the transmission assembly in its current operating mode until the accumulator has been charged such that the state of charge meets the threshold charge level.

CONCLUSION

The foregoing has thus provided a transmission system for a work vehicle featuring a transmission assembly having an input shaft, an output shaft, and a plurality of clutches operable to transmit power from the input shaft to the output shaft at a plurality of gear ratios. A traction motor drives the input shaft and operates a drive component to propel the work vehicle, and a controller controls operation of the transmission assembly and the traction motor. A hydraulic circuit controls actuation of the plurality of clutches responsive to commands from the controller, with the hydraulic circuit including a hydraulic pump driven by the traction motor to draw hydraulic fluid from a sump and circulate the hydraulic fluid through the hydraulic circuit, an accumulator connected to the hydraulic pump via a high-pressure fluid path and configured to hold hydraulic fluid therein under pressure to provide for actuation of the plurality of clutches, and an unloading valve positioned in a secondary fluid path running from an outlet of the hydraulic pump to the sump. The unloading valve is operable in a closed state to cause a flow of hydraulic fluid from the hydraulic pump to be directed to the high-pressure fluid path and is operable in an open state to cause a flow of hydraulic fluid from the hydraulic pump to be directed to the sump.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A transmission system for a work vehicle, the transmission system comprising:
   a transmission assembly having an input shaft, an output shaft, and a plurality of clutches operable to transmit power from the input shaft to the output shaft at a plurality of gear ratios;
   a traction motor to drive the input shaft to propel the work vehicle;
   a controller, including a processor and memory architecture, that controls operation of the transmission assembly and the traction motor;
   a hydraulic circuit configured to control actuation of the plurality of clutches responsive to commands from the controller, the hydraulic circuit comprising:
   a hydraulic pump driven by the traction motor to draw hydraulic fluid from a sump and circulate the hydraulic fluid through the hydraulic circuit;
   an accumulator connected to the hydraulic pump via a high-pressure fluid path and configured to hold hydraulic fluid therein under pressure to provide for actuation of the plurality of clutches; and an unloading valve positioned in a secondary fluid path running from an outlet of the hydraulic pump to the sump;

wherein the unloading valve is operable in a closed state to cause a flow of hydraulic fluid from the hydraulic pump to be directed to the high-pressure fluid path and is operable in an open state to cause a flow of hydraulic fluid from the hydraulic pump to be directed to the sump; and wherein the controller is programmed to:
 determine a state of charge of the accumulator; and
 selectively operate the unloading valve based on the state of charge of the accumulator.

2. The transmission system of claim 1, wherein in determining the state of charge of the accumulator the controller is programmed to:
 identify a needed state of charge of the accumulator necessary to perform a requested operation for the transmission assembly; and
 determine if a current state of charge of the accumulator meets the needed state of charge.

3. The transmission system of claim 2, wherein when the current state of charge meets the needed state of charge the controller is programmed to operate the unloading valve in the open state to cause hydraulic fluid to be pumped directly from the hydraulic pump to the sump.

4. The transmission system of claim 3, wherein when the current state of charge meets the needed state of charge the controller is programmed to allow actuation of the plurality of clutches to drive the output shaft in any of the plurality of gear ratios.

5. The transmission system of claim 2, wherein when the current state of charge does not meet the needed state of charge the controller is programmed to operate the unloading valve in the closed state to cause hydraulic fluid to be pumped from the hydraulic pump to the high-pressure fluid path and charge the accumulator.

6. The transmission system of claim 5, wherein when operating the unloading valve in the closed state the controller is programmed to determine a current operational state of the work vehicle, the current operational state comprising one of a startup sequence and a normal operating mode.

7. The transmission system of claim 6, wherein when the work vehicle is in the startup sequence the controller is programmed to:
 operate the transmission assembly in neutral;
 operate the traction motor to drive the hydraulic pump and thereby cause hydraulic fluid to be pumped from the hydraulic pump to the high-pressure fluid path and charge the accumulator; and
 maintain operation of the transmission assembly in neutral and operation of the traction motor to drive the hydraulic pump until the accumulator has been charged such that the current state of charge meets the needed state of charge.

8. The transmission system of claim 6, wherein when the work vehicle is in the normal operating mode the controller is programmed to:
 prevent actuation of the plurality of clutches to limit operation of the transmission assembly to its current operating mode, with the traction motor driving the hydraulic pump to thereby cause hydraulic fluid to be pumped from the hydraulic pump to the high-pressure fluid path and charge the accumulator; and
 maintain operation of the transmission assembly in its current operating mode until the accumulator has been charged such that the current state of charge meets the needed state of charge.

9. The transmission system of claim 2, wherein the needed state of charge for performing the requested operation for the transmission assembly comprises a clutch pressure sufficient for actuation of one or more of the plurality of clutches during a shift event.

10. A controller-implemented method for operating a transmission system of a work vehicle, the method comprising:
 providing a transmission assembly having an input shaft, an output shaft, and a plurality of clutches operable to transmit power from the input shaft to the output shaft at a plurality of gear ratios;
 providing a traction motor configured to drive the input shaft of the transmission assembly and propel the work vehicle;
 operating, via a controller, the traction motor to drive a hydraulic pump to draw hydraulic fluid from a sump and circulate the hydraulic fluid through a hydraulic circuit;
 selectively charging, via the controller, an accumulator fluidly coupled to the hydraulic pump with the hydraulic fluid to provide for actuation of the plurality of clutches;
 operating, via the controller, an unloading valve positioned in a secondary fluid path running from an outlet of the hydraulic pump to the sump to direct a flow of hydraulic fluid from the hydraulic pump within the hydraulic circuit;
 identifying, via the controller, a state of charge of the accumulator; and
 determining, via the controller, if the state of charge of the accumulator meets a threshold charge level; and
 wherein operating the unloading valve comprises:
  operating the unloading valve in a closed state to direct the flow of hydraulic fluid from the hydraulic pump to the accumulator;
  operating the unloading valve in an open state to direct the flow of hydraulic fluid from the hydraulic pump directly to the sump; and
  selectively operating the unloading valve based on whether the state of charge of the accumulator meets the threshold charge level, with the unloading valve operated in the closed state when the state of charge does not meet the threshold charge level and operated in the open state when the state of charge meets the threshold charge level.

11. The method of claim 10, wherein when operating the unloading valve in the closed state, the method further comprises determining, via the controller, a current operational state of the work vehicle, the current operational state comprising one of a startup sequence and a normal operating mode.

12. The method of claim 11, wherein when the work vehicle is in the startup sequence, the method further comprises:
 operating the transmission assembly in neutral;
 operating the traction motor to drive the hydraulic pump, to thereby cause hydraulic fluid to be pumped from the hydraulic pump to charge the accumulator; and
 maintaining operation of the transmission assembly in neutral and operation of the traction motor to drive the hydraulic pump until the accumulator has been charged such that the state of charge meets the threshold charge level.

13. The method of claim 11, wherein when the work vehicle is in the normal operating mode, the method further comprises:
preventing actuation of the plurality of clutches to limit operation of the transmission assembly to its current operating mode, with the traction motor driving the hydraulic pump to thereby cause hydraulic fluid to be pumped from the hydraulic pump to charge the accumulator; and
maintaining operation of the transmission assembly in its current operating mode until the accumulator has been charged such that the state of charge meets the threshold charge level.

14. A power train of a work vehicle, the power train comprising:
a transmission comprising a plurality of clutches configured for selective engagement to operate the work vehicle in a plurality of gears;
a traction motor to provide power to drive an input side of the transmission and propel the work vehicle;
a controller, including a processor and memory architecture, that controls operation of the transmission;
a hydraulic circuit for operating the transmission and actuating the plurality of clutches therein, the hydraulic circuit comprising:
a hydraulic pump driven by the traction motor to circulate hydraulic fluid in the hydraulic circuit from a sump along a high-pressure fluid path;
an accumulator connected to the high-pressure fluid path and configured to hold hydraulic fluid therein under pressure to provide for actuation of the plurality of clutches when charged; and
an unloading valve positioned in a secondary fluid path running from an outlet of the hydraulic pump to the sump;
wherein the unloading valve is operable in a closed state to cause a flow of hydraulic fluid from the hydraulic pump to be directed to the high-pressure fluid path and is operable in an open state to cause a flow of hydraulic fluid from the hydraulic pump to be directed to the sump; and
wherein the controller is programmed to:
identify a state of charge of the accumulator;
determine if the state of charge of the accumulator meets a threshold charge level; and
selectively operate the unloading valve based on whether the state of charge of the accumulator meets the threshold charge level, with the unloading valve operated in the closed state when the state of charge does not meet the threshold charge level and operated in the open state when the state of charge meets the threshold charge level.

15. The power train of claim 14, wherein when operating the unloading valve in the closed state, the controller is programmed to determine a current operational state of the work vehicle, the current operational state comprising one of a startup sequence and a normal operating mode.

16. The power train of claim 15, wherein when the work vehicle is in the startup sequence the controller is programmed to:
operate the transmission in neutral;
operate the traction motor to drive the hydraulic pump to thereby cause hydraulic fluid to be pumped from the hydraulic pump to the high-pressure fluid path and charge the accumulator; and
maintain operation of the transmission in neutral and operation of the traction motor to drive the hydraulic pump until the accumulator has been charged such that the state of charge meets the threshold charge level.

17. The power train of claim 15, wherein when the work vehicle is in the normal operating mode the controller is programmed to:
prevent actuation of the plurality of clutches to limit operation of the transmission to its current operating mode, with the traction motor driving the hydraulic pump to thereby cause hydraulic fluid to be pumped from the hydraulic pump to the high-pressure fluid path and charge the accumulator; and
maintain operation of the transmission in its current operating mode until the accumulator has been charged such that the state of charge meets the threshold charge level.

* * * * *